United States Patent [19]

Mohr et al.

[11] 4,344,879
[45] Aug. 17, 1982

[54] QUATERNARY AND BASIC AZAMETHINE COMPOUNDS AND THEIR USE AS COLORANTS

[75] Inventors: Reinhard Mohr, Offenbach am Main; Manfred Hähnke, Kelkheim, both of Fed. Rep. of Germany

[73] Assignee: Hoechst Aktiengesellschaft, Fed. Rep. of Germany

[21] Appl. No.: 204,323

[22] Filed: Nov. 5, 1980

[30] Foreign Application Priority Data

Nov. 8, 1979 [DE] Fed. Rep. of Germany ....... 2945028

[51] Int. Cl.³ .................... C07D 209/14; C07B 23/16
[52] U.S. Cl. .............................. 260/146 R; 260/165; 542/417; 542/422
[58] Field of Search ............................ 542/417, 422; 260/146 R, 165

[56] References Cited

U.S. PATENT DOCUMENTS

| | | | |
|---|---|---|---|
| 3,113,825 | 10/1963 | Streck | 542/422 |
| 3,345,355 | 10/1967 | Rave | 542/417 |
| 3,741,982 | 6/1973 | Fujino et al. | 542/417 |
| 3,759,902 | 9/1973 | Kuhlthau et al. | 542/422 |
| 3,769,279 | 10/1973 | Kuhlthau et al. | 542/417 |
| 3,786,047 | 1/1974 | Kuhlthau | 542/422 |
| 4,176,229 | 11/1979 | Kast | 542/422 |
| 4,251,656 | 2/1981 | Loew et al. | 542/417 |
| 4,281,112 | 7/1981 | Lehment et al. | 542/417 |

*Primary Examiner*—Arthur P. Demers
*Attorney, Agent, or Firm*—Connolly and Hutz

[57] ABSTRACT

Novel azamethine compounds of the formula (1)

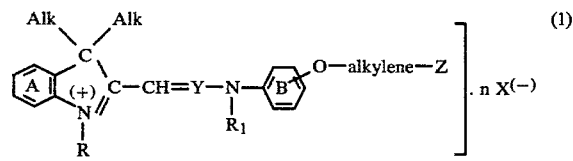

in which R is alkyl of from 1 to 4 carbon atoms optionally substituted, Alk is alkyl of from 1 to 4 carbon atoms, Y is the methine radical or a nitrogen atom, $R_1$ is hydrogen or alkyl of from 1 to 4 carbon atoms optionally substituted, alkylene is an alkylene group of from 2 to 6 carbon atoms, Z is a group of the formula (2a) or (2b)

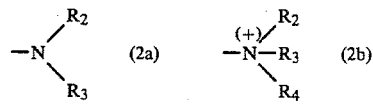

in which $R_2$ is alkyl of from 1 to 4 carbon atoms optionally substituted, $R_3$ is alkyl of from 1 to 4 carbon atoms optionally substituted, or is phenyl unsubstituted or substituted by chlorine, alkyl of from 1 to 4 carbon atoms, alkoxy of from 1 to 4 carbon atoms, nitro, carbalkoxy of from 2 to 5 carbon atoms and/or carbamoyl, $R_4$ is hydrogen or alkyl of from 1 to 4 carbon atoms optionally substituted, or $R_2$ and $R_3$ together with the nitrogen atom form a heterocyclic ring containing optionally nitrogen, oxygen or sulfur as a further hetero atom, or $R_2$ and $R_3$ or $R_2$, $R_3$ and $R_4$ together with the positive nitrogen form a heterocyclic ring containing optionally nitrogen, oxygen or sulfur as a further hetero atom, the benzene nucleus A is unsubstituted or substituted by halogen, nitro, cyano, sulfamoyl, alkyl of from 1 to 4 carbon atoms, alkoxy of from 1 to 4 carbon atoms and/or carbalkoxy of from 2 to 5 carbon atoms, the benzene nucleus B is unsubstituted or substituted by halogen, nitro, alkyl of from 1 to 4 carbon atoms, alkoxy of from 1 to 4 carbon atoms and/or carbalkoxy of from 2 to 5 carbon atoms, n is the integer 1 or 2, and $X^{(-)}$ is the equivalent of a colorless anion.

These novel compounds can be prepared in usual manner analogously to known processes using the corresponding indoline and alkoxyaniline derivatives as starting compounds with optional subsequent alkylation.

The novel azamethine compounds are well suitable as dyestuffs, soluble in water and in acids as well as in various organic solvents, for the dyeing of preferably acid-modified aromatic polyesters, acid-modified polyamides and acid-modified polyacrylonitrile materials, especially those in the form of fibres or in the mass by means of a spin-dyeing procedure.

6 Claims, No Drawings

QUATERNARY AND BASIC AZAMETHINE COMPOUNDS AND THEIR USE AS COLORANTS

The invention relates to the industrial field of basic and cationic azamethine dyestuffs.

Azamethine dyestuffs which contain, as components, the "Fischer base" and an alkoxy- or aryloxy-substituted phenylamino moiety, are known from German Offenlegungsschriften No. 2,502,024, 2,503,098 and 2,630,233. However, these dyestuffs have certain deficiencies in their technological properties.

New azamethine compounds of the general formula (1)

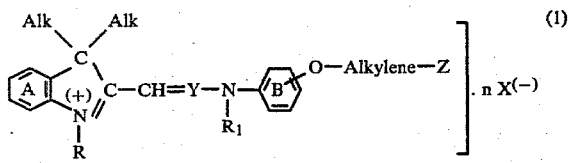

have now been found. In the formula (1), these symbols have the following meanings: R is an alkyl group which has 1 to 4 C atoms and can be substituted, for example by a carbamoyl group (—CONH$_2$), an alkanoyloxy group with 1 to 4 C atoms, a carbalkoxy group with 1 to 4 C atoms in the alkyl radical or a hydroxy, cyano or phenyl group; Alk is an alkyl group with 1 to 4 C atoms, it being possible for the two radicals Alk to be identical or different from one another; Y is the methine radical (CH) or a nitrogen atom; $R_1$ is a hydrogen atom or an alkyl group which has 1 to 4 C atoms and can be substituted, for example by a carbamoyl group, an alkanoyloxy group with 1 to 4 C atoms, a carbalkoxy group with 1 to 4 C atoms in the alkyl radical or a hydroxy, cyano or phenyl group; Alkylene is a straight-chain or branched alkylene group with 2 to 6 C atoms; Z is a group of the formula (2a) or (2b)

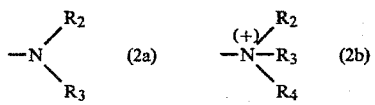

in which $R_2$ is an alkyl group which has 1 to 4 C atoms and can be substituted, for example by a carbamoyl group, an alkanoyloxy group with 1 to 4 C atoms, a carbalkoxy group with 1 to 4 C atoms in the alkyl radical or a hydroxy, cyano or phenyl group, $R_3$ is an alkyl group which has 1 to 4 C atoms and can be substituted, for example by a carbamoyl group, an alkanoyloxy group with 1 to 4 C atoms, a carbalkoxy group with 1 to 4 C atoms in the alkyl radical or a hydroxy, cyano or phenyl group, or $R_3$ is the phenyl radical, which can be substituted by 1 or 2 substituents from the group comprising chlorine, alkyl with 1 to 4 C atoms, alkoxy with 1 to 4 C atoms, nitro, carbalkoxy with 1 to 4 C atoms in the alkyl radical and carbamoyl, and $R_4$ is a hydrogen atom or an alkyl group which has 1 to 4 C atoms and can be substituted, for example by a carbamoyl group, an alkanoyloxy group with 1 to 4 C atoms, a carbalkoxy group with 1 to 4 C atoms in the alkyl radical or a hydroxy, cyano or phenyl group, or in which $R_2$ and $R_3$, together with the nitrogen atom, form a five-membered, six-membered or seven-membered heterocyclic radical, which can also contain, as a further hetero-atom, a nitrogen, oxygen or sulfur atom, such as, for example, the piperidine, piperazine or morpholine ring, or $R_2$ and $R_3$ or $R_2$, $R_3$ and $R_4$, together with the positively charged nitrogen atom, form a five-membered, six-membered or seven-membered heterocyclic radical, which can also contain, as a further hetero-atom, a nitrogen, oxygen or sulfur atom, such as, for example, the piperidinium, morpholinium, piperazinium, 4-N-methylpiperazinium or pyridinium radical, in which $R_4$ can either be part of the heterocyclic radical or a hydrogen atom or the said alkyl group; the benzene nucleus A can be substituted by 1 or 2, preferably one, substituent from the group comprising halogen, such as chlorine and bromine, nitro, cyano, sulfamoyl, alkyl with 1 to 4 C atoms, alkoxy with 1 to 4 C atoms and carbalkoxy with 1 to 4 C atoms in the alkyl radical; the benzene nucleus B can be substituted by 1 or 2, preferably one, substituents from the group comprising halogen, such as chlorine, nitro, alkyl with 1 to 4 C atoms, alkoxy with 1 to 4 C atoms and carbalkoxy with 1 to 4 C atoms in the alkyl radical; n is the number 1 or 2; and $X^{(-)}$ is the equivalent of a colorless anion.

The radicals R, $R_1$, $R_2$, $R_3$, $R_4$ and Alk in the formula and also the substituents of A and B can have the same meanings as one another or can have different meanings from one another. Preferably, $R_4$ has the same meaning as $R_1$.

The abovementioned alkyl groups are preferably methyl and ethyl groups, and the alkoxy groups are preferably methoxy and ethoxy groups; carbalkoxy groups are preferably carbomethoxy and carbethoxy groups, and alkanoyloxy groups are preferably the acetyloxy group.

The present invention also relates to the corresponding compounds in the form of bases, according to the general formula (1A)

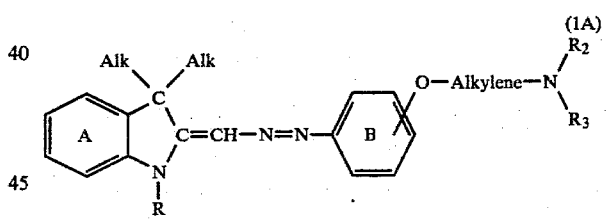

and salts thereof of the formula (1B)

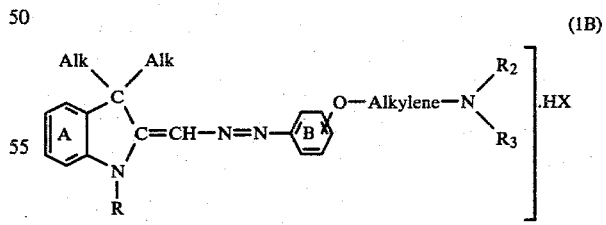

in which R, Alk, Alkylene, $R_2$ and $R_3$ and the benzene nuclei A and B have the abovementioned meanings and HX is an inorganic or organic acid, for example sulfuric acid, phosphoric acid, hydrochloric acid, acetic acid or tetrafluoboric acid.

The present invention furthermore relates to processes for the preparation of the abovementioned and defined cationic and basic compounds of the general formulae (1).

Compounds of the general formula (1) in which the radical Y in the formula represents the above-mentioned methine radical can be prepared, according to the invention, by reacting an aldehyde compound of the general formula (3)

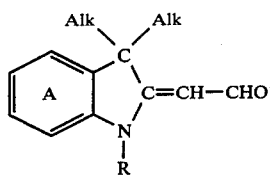
(3)

in which R, Alk and A have the abovementioned meanings, with an amine of the general formula (4)

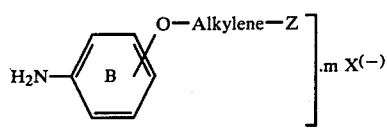
(4)

in which Alkylene, B, Z and $X^{(-)}$ have the abovementioned meanings and m represents the number zero or 1, such as in a manner analogous to known and customary reactions, in the presence of an acid which contains the anion equivalent $X^{(-)}$, or by reacting a 2-methyleneindoline compound of the general formula (5)

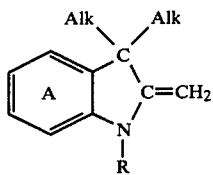
(5)

in which A, R and Alk have the abovementioned meanings, with a N-formyl compound of the general formula (6)

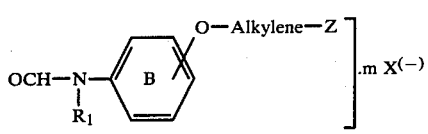
(6)

in which Alkylene, B, $R_1$, Z, m and $X^{(-)}$ have the abovementioned meanings, such as in a manner analogous to known and customary reactions, in the presence of an acid which contains the anion equivalent $X^{(-)}$, or, if $R_1$ denotes an optionally substituted alkyl group, by reacting an azamethine compound of the general formula (7) or (7a)

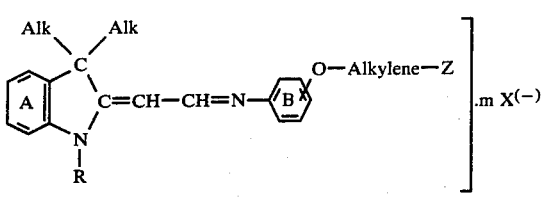
(7)

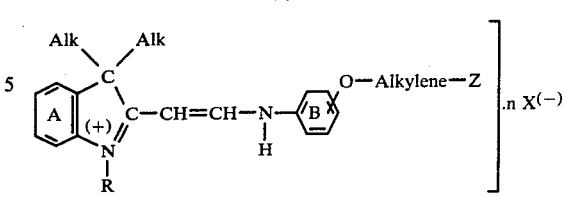
(7a)

in which A, B, R, Alk, Alkylene, Z, m, n and $X^{(-)}$ have the abovementioned meanings, with an alkylating agent which contains the optionally substituted alkyl radical $R_1$ (or $R_4$), such as in a manner analogous to known and customary procedures.

The new azamethine compounds of the general formula (1) in which the radical Y in the formula represents a nitrogen atom can be prepared according to the invention by coupling a 2-methyleneindoline compound of the abovementioned general formula (5) with a diazonium compound of the general formula (8)

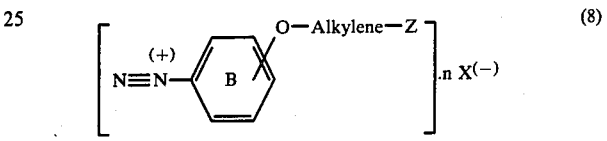
(8)

in which B, Alkylene, Z, n and $X^{(-)}$ have the abovementioned meanings, such as in a manner analogous to known and customary reactions, and reacting the resulting coupling product of the general formula (9)

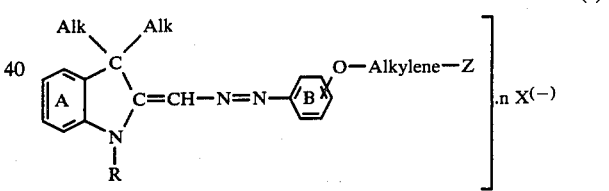
(9)

in which A, B, R, Alk, Alkylene, Z, n and $X^{(-)}$ have the abovementioned meanings, with an alkylating agent which contains an optionally substituted alkyl group $R_1$ (or $R_4$), such as in a manner analogous to known and customary reactions, or, if the radicals R and $R_1$ in the formula have the same meanings, by coupling a diazonium compound of the abovementioned formula (8) with an indolenine compound of the general formula (10)

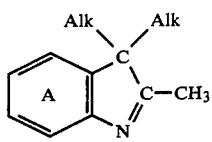
(10)

in which A and Alk have the abovementioned meanings, such as in a manner analogous to known and customary procedures, and reacting the resulting hydrazone compound of the general formula (11)

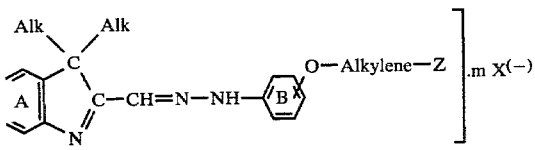

(11)

n which A, B, Alk, Alkylene, Z, m and $X^{(-)}$ have the abovementioned meanings, with twice the molar amount—or, if Z is a radical of the formula (2b) in formula (1) or a radical of the formula (2a) in formula (11), with 3 times the molar amount—of an alkylating agent which contains the optionally substituted alkyl group R (or $R_1$ or $R_4$), such as in a manner analogous to known and customary reactions.

The new basic compounds of the general formula (1A) are obtained from the abovementioned compounds of the general formula (9), in which Z is a group of the formula (2a) and n is the number 1, in a manner as known and customary, by reacting these salts with a basic compound, such as ammonia or an alkali metal hydroxide or carbonate, and converting the salts into their basic compounds.

The salts of the general formula (1B) correspond to the said compounds of the general formula (9) in which Z is the group of the formula (2a) and n is the number 1; they can be prepared from the bases of the formula (1A) in a manner which is familiar and customary to the expert, by reaction with an acid.

Anions corresponding to the equivalent $X^{(-)}$ are, for example, the chloride, bromide, sulfate, nitrate, iodide, thiocyanate, acetate, propionate, formate or oxalate anion or a lower alkosulfate anion, such as the methosulfate or ethosulfate anion, or the anions of citric acid, lactic acid, phosphoric acid, phosphotungstic or perchloric acid or of aromatic sulfonic acids, such as naphthalene-1,5-disulfonic acid, or the trichlorozincate, tetrachlorozincate or tetrafluoborate anion.

The abovementioned reaction of a compound of the general formula (3) with a compound of the general formula (4) to give methine compounds of the general formula (1) in which Y is the abovementioned methine radical can be carried out in a manner which is in itself customary, analogously to known procedures; thus, for example, it can be carried out with equimolar amounts of the starting compounds in an organic or inorganic acid with a colorless anion or in mixtures thereof with water, at a temperature of 10° to 140° C., preferably at 20° to 60° C. The methyleneindolines of the general formula (5) can be reacted with the N-formyl compounds of the general formula (6) in the same manner.

Suitable acids for this reaction are, for example, dilute aqueous mineral acids, such as sulfuric acid, hydrochloric acid or phosphoric acid, and also lower alkanecarboxylic acids, such as formic acid, acetic acid, propionic acid, lactic acid and citric acid, and mixtures thereof with water or lower alkanols, such as methanol or ethanol, or with acetone, dimethylformamide or dimethylsulfoxide.

The abovementioned coupling reactions to give the coupling products of the general formulae (9) and (11) can likewise be carried out in a manner which is in itself customary, analogously to known process measures. Thus, the diazotization of the amine of the general formula (4) to give the diazonium compound of the general formula (8) is carried out by the well-known procedure in acid solution, for example in dilute aqueous hydrochloric acid, with an alkali metal nitrite at a temperature between −10° C. and +10° C., and the subsequent reaction (coupling) with the indole derivative of the general formula (5) or (10) is likewise carried out in the well-known manner in aqueous solution at a pH value between 1 and 9. The free basic compound, in particular also the compound of the general formula (1A), can be obtained from their salts and precipitated by adding a basic agent, such as, for example, sodium hydroxide, potassium hydroxide, sodium carbonate, potassium carbonate or ammonia. In some cases, the free base first separates out in the form of an oil, but usually crystallizes after some time, so that it is possible to separate it off by filtration. The resulting bases, corresponding to the compounds of the general formulae (7), (9) and (11), are then reacted with an alkylating agent which contains the optionally substituted alkyl group $R_1$ (or $R_4$); the alkylation reaction can likewise be carried out in a manner which is in itself customary, analogously to known alkylation reactions, in an aqueous or aqueous-organic medium or organic medium (the organic medium being inert towards alkylation reactions) and at a pH value of 5 to 10 and a temperature between 20° and 150° C., preferably at 30° to 90° C.; in order to maintain the pH range, the alkylation is advantageously carried out in the presence of an acid-binding agent, such as, for example, magnesium oxide, sodium bicarbonate, calcium oxide, calcium carbonate, sodium carbonate, potassium carbonate, zinc oxide or an organic base which cannot be alkylated (see, for example, Belgian Pat. No. 735,565).

In the alkylation reactions of the abovementioned process variants for the preparation of the compounds of the general formula (1) according to the invention, starting from the compounds of the general formulae (7) and (9), the radical $R_1$ may be introduced, and, if desired, the radical $R_4$ into Z. In the alkylation, according to the invention, of the bases corresponding to the compounds of the general formula (11), the optionally substituted alkyl groups corresponding to the radicals R, $R_1$ and, if desired, $R_4$ can be simultaneously introduced; in this case, R, $R_1$ and $R_4$ are identical to one another.

The alkylation reaction is in general carried out in aqueous, aqueous-alcoholic or alcoholic solution or suspension, the lower alcohols forming the organic-alcoholic medium. The alkylation is carried out with an excess of the alkylating agent, since this, as is customary, can easily be hydrolyzed.

Alkylating agents are, for example, the corresponding lower alkyl halides, the lower alkyl esters of aromatic sulfonic acids and the sulfuric acid lower dialkyl esters, such as, for example, methyl chloride, methyl bromide, methyl iodide, ethyl bromide, ethyl iodide, propyl bromide, propyl iodide, benzyl chloride, dimethyl sulfate, diethyl sulfate, methyl, ethyl, propyl and butyl benzenesulfonate and methyl, ethyl, propyl and butyl p-toluenesulfonate, and furthermore chloroacetamide, β-chloropropionitrile, ethylene chlorohydrin, lower alkylene oxides and acrylyl derivatives, such as, for example, propylene oxide and acrylamide.

It is expedient for alkylene oxides and acrylyl derivatives, as alkylating agents, to be employed in the alkylation reaction in the presence of an inorganic or organic acid.

In some cases it may be expedient to carry out the alkylation reaction in an organic solvent, such as, for example, in acetone, chloroform, dimethylformamide, toluene, chlorobenzene or N-methyl-pyrrolidone. In this medium, it is in general sufficient to employ the alkylating agent in an equimolar amount, but in this case also, it is advantageous to add a basic compound, such as, for example, magnesium oxide, in order to bring the alkylation reaction to completion.

The cationic compounds of the general formula (1) and, if appropriate, (1B) or (9) can be isolated from the preparation mixtures by a procedure in which any organic solvent used is driven off with steam and the salts are salted out of the aqueous solution by adding an electrolyte, such as sodium chloride, potassium chloride or sodium sulfate. If the salts are already sparingly soluble themselves, they can be isolated by filtration. Soluble salts which have been obtained by a procedure according to the invention can also be precipitated by adding a compound containing an anion which converts the readily soluble salt into a sparingly soluble salt which crystallizes readily, or by adding a compound which, as a result of complex formation with the anion, leads to a sparingly soluble salt which crystallizes readily, and the products can be filtered off. Examples of compounds of this type are sodium perchlorate—for formation of the perchlorate salts of the compounds of the general formula (1)—phosphotungstic acid, sodium tetrafluoborate and zinc chloride, the latter for the formation of the trichlorozincate and tetrachlorozincate salts, and also aromatic sulfonic acids known for this purpose, such as naphthalene-1,5-disulfonic acid. After filtration, the insoluble or sparingly soluble salts can be obtained in a pure, salt-free form by washing briefly with water or a lower alkanol, such as ethanol.

The preferred anions in the azamethine compounds of the general formula (1) according to the invention are the chloride, sulfate, methosulfate, ethosulfate, tetrafluoborate, tetrachlorozincate and thiocyanate anion.

Of the quaternary azamethine compounds of the general formula (1) according to the invention, the compounds of the general formulae (1a), (1b), (1c) and (1d)

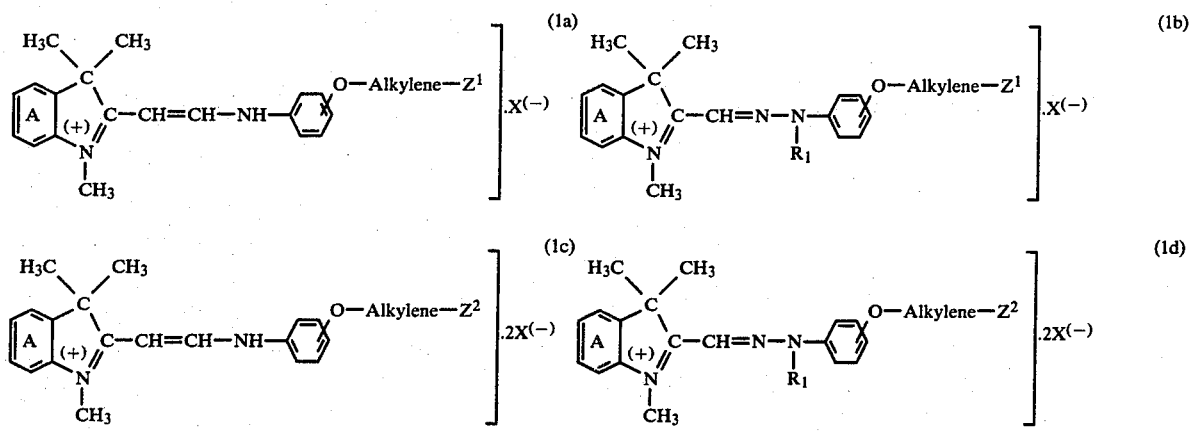

in which the benzene nucleus A can be substituted, preferably by one substituent from the group comprising halogen, in particular chlorine, methyl, methoxy and carbalkoxy with 1 to 4 C atoms in the alkyl radical, in particular carbomethoxy and carbethoxy, Alkylene has the abovementioned meaning, $Z^1$ denotes a dialkylamino group with in each case 1 to 4 C atoms in the alkyl radicals and $Z^2$ denotes a dialkylammonium or trialkylammonium group with in each case 1 to 4 C atoms in the alkyl radicals, $R_1$ represents a methyl or ethyl group and $X^{(-)}$ has one of the abovementioned meanings, in particular one of the preferred meanings, are to be mentioned as preferred.

Of the individual compounds according to the invention, the compounds of the general formulae (a) to (h)

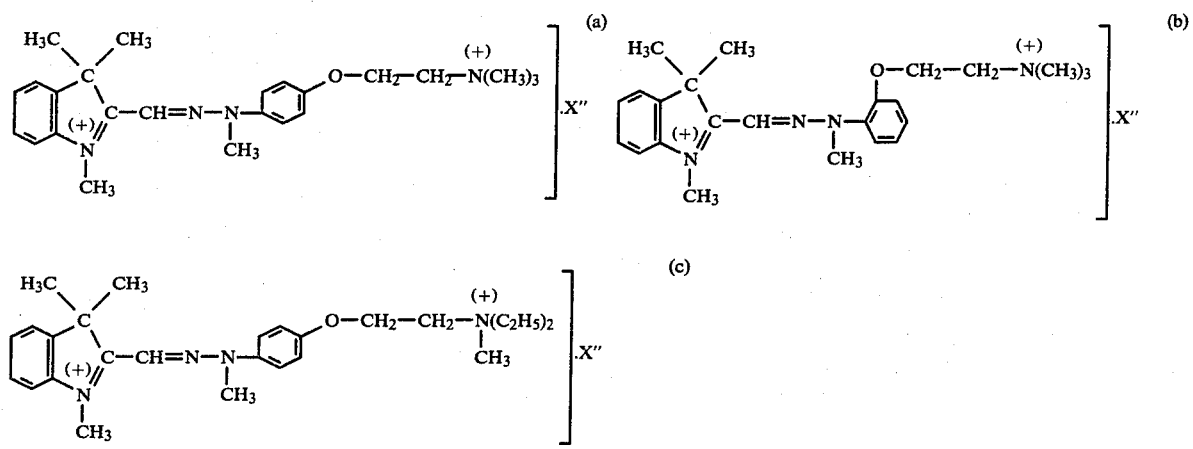

$$\left[\begin{array}{c}\underset{H_3C}{\overset{CH_3}{\diagdown}}\underset{\underset{CH_3}{\overset{|}{N}}}{\overset{(+)}{\diagup}}C{-}CH{=}CH{-}NH{-}\underset{}{\diagdown}{-}O{-}CH_2{-}CH_2{-}\overset{(+)}{N}H(CH_3)_2\end{array}\right].X''\quad (d)$$

$$\left[\begin{array}{c}\underset{H_3C}{\overset{CH_3}{\diagdown}}\underset{\underset{CH_3}{\overset{|}{N}}}{\overset{(+)}{\diagup}}C{-}CH{=}CH{-}NH{-}\underset{}{\diagdown}{-}O{-}CH_2{-}CH_2{-}\overset{(+)}{N}H(CH_3)_2\end{array}\right].X''\quad (e)$$

$$\left[\begin{array}{c}\underset{H_3C}{\overset{CH_3}{\diagdown}}\underset{\underset{CH_3}{\overset{|}{N}}}{\overset{(+)}{\diagup}}C{-}CH{=}CH{-}NH{-}\underset{}{\diagdown}{-}O{-}CH_2{-}CH_2{-}\overset{(+)}{N}H(C_2H_5)_2\end{array}\right].X''\quad (f)$$

(g) $H_3C\diagdown C\diagup CH_3$ ... C=CH—CH=N—⟨⟩—O—CH$_2$—CH$_2$—N(CH$_3$)$_2$ (h) $H_3C\diagdown C\diagup CH_3$ ... C=CH—CH=N—⟨⟩—O—CH$_2$—CH$_2$—N(CH$_3$)$_2$:

are to be singled out in particular. In this formulae (a) to (f), X" represents one colorless anion equivalent, that is to say, two anions with a single charge or one anion with a double charge. In the formulae (a), (b), (c) and (e), X" preferably represents two tetrafluoborate anions, in formula (b), X" is also preferably the tetrachlorozincate anion. In the formulae (d) and (f), X" likewise is preferably the tetrachlorozincate anion, and in formula (d), X" furthermore preferably denotes two acetate anions.

The compounds of the general formulae (3), (4), (5) and (10) which can be used as starting compounds for the preparation of the azamethine compounds of the general formulae (1) and (1A) according to the invention can be prepared by known processes, and are known, for example, from German Pat. No. 501,088, German Auslegeschrift No. 1,906,832 and German Offenlegungsschriften Nos. 2,040,653 and 2,154,246.

The azamethine compounds according to the invention, in particular the quaternary azamethine compounds of the general formula (1), and preferably those of the general formulae (1a) and (1b), are valuable colorants, in particular valuable water-soluble or acid-soluble dyestuffs, which are suitable for dyeing (including printing) materials of leather, tannin-treated cotton and lignin-containing fibers, such as coir, jute and sisal, but in particular for dyeing polyacrylonitrile, preferably acid-modified polyacrylonitrile, and copolymers, preferably acid-modified copolymers, of acrylonitrile and other vinyl compounds, and furthermore acid-modified aromatic polyesters and acid-modified polyamides. These synthetic materials are preferably employed in the form of materials having a fibrous structure, such as in the form of the fibers themselves or in the form of filaments, flocks, slivers, woven fabrics or knitted fabrics. The azamethine compounds according to the invention are furthermore suitable for the preparation of writing fluids, rubber-stamp inks and ball-point pen pastes, and they can also be used in flexographic printing. They can furthermore be used for dyeing paper.

The present invention thus also relates to the use of the azamethine compounds of the general formulae (1) for dyeing (including printing) the abovementioned materials and to processes for dyeing (including printing) these materials, in which the dyestuffs are applied to the material in a manner which is in itself customary for basic and cationic dyestuffs, and are fixed on the material.

Vinyl compounds which can be employed as the component in the copolymer with acrylonitrile are vinyl chloride, vinylidene chloride, vinyl fluoride, vinyl acetate, vinylpyridine, vinylimidazole, vinyl alcohol, acrylates and acrylamides and methacrylates and methacrylamides, and furthermore as.-dicyanoethylene.

Acid-modified aromatic polyesters which can be dyed with the compounds according to the invention are, for example, polycondensation products of sulfoterephthalic acid and ethylene glycol, that is to say polyethylene glycol terephthalates containing sulfonic acid groups. Such polyesters are known, for example, from Belgian Pat. No. 549,179 and from U.S. Pat. Nos. 2,893,816 and 3,379,723. Acid-modified polyamides are described, for example, in Belgian Pat. No. 706,104.

The acid-modified materials, in particular in the form of fibers, are in general dyed from a weakly acid liquor at a pH value of about 3.5 to 6.5; the dyeing is as a rule carried out by a procedure analogous to known procedures for dyeing polyamide fibers or acid-modified fiber materials. It is expedient to start the dyeing by introducing the material to be dyed into the dyebath, which has been rendered weakly acid, at a temperature of 40° to 60° C., gradually increasing the dyeing temperature and finally dyeing at the boiling point of the dyebath. Dyeing can likewise also be carried out under pressure at temperatures above 100° C. Moreover, the compounds according to the invention can be applied to the unstretched fibers present in gel form, such as, for example, fibers having a polyacrylonitrile structure.

The dyeings obtained with the compounds according to the invention on polyacrylonitrile and copolymers thereof, on acid-modified polyesters and on acid-modified polyamide are distinguished by good fastness to light, wet processing, rubbing and sublimation. The compounds according to the invention have a high affinity for these substrates and their corresponding fiber materials. They have a good stability to boiling and have proved to be absorbed rapidly in combination with other basic dyestuffs. They also exhibit a good compatibility with salts and a good stability to changes in pH.

With anionic precipitating agents, such as alumina, tannin or phosphotungstic or phosphomolybdic acids, the compounds according to the invention furthermore form pigments which are fast to light and which can advantageously be employed for printing paper.

The compounds according to the invention can be used, as colorants, individually or as mixtures with one another.

To prepare the aqueous dyebaths and printing pastes, the dyestuffs can be used in the form of powders, which optionally contain formulating agents, such as, for example, inorganic salts (sodium sulfate or sodium chloride) and dextrin and, if appropriate, other additives, such as dyeing auxiliaries, levelling auxiliaries which have an affinity for the fibers and levelling auxiliaries which have an affinity for the dyestuff. However, it is advantageous to employ concentrated aqueous dyestuff solutions, which are easier to handle and contain about 20 to 60 percent by weight of dye-stuff, one or more lower aliphatic carboxylic acids, such as formic acid, acetic acid, propionic acid or lactic acid, and, if appropriate, other additives which are suitable and customary in concentrated dyeing preparations, such as water-soluble polyhydric alcohols, ethers or esters thereof, polyethers, aliphatic carboxylic acid amides, lactams, lactones, nitriles, dimethylsulfoxide, diacetone-alcohol, dioxane, tetrahydrofuran or urea.

To prepare the dyebaths, which contain only organic solvents, for example a chlorinated hydrocarbon, advantageously concentrated solutions containing the dyestuff as the free base or as a salt of a monobasic organic acid and chlorinated hydrocarbons, organic acids or polar organic solvents are used.

In some cases, it can be advantageous for the anhydro compounds of the formulae (1A) and (7) and for the carbinol bases of the general formula (12)

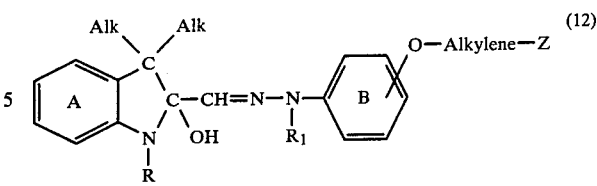

in which A, B, R, $R_1$, Alk, Alkylene and Z have the abovementioned meanings obtainable from the compounds of the general formula (1) according to the invention by adding excess alkali to be employed for spin-dyeing. Since these compounds of the formulae (1A), (7) and (12) are virtually insoluble in water, it is possible for dyeing preparations which are completely free from salts, and thus are free from residues, and are soluble in dimethylformamide or dimethylacetamide by adequate washing with water. Since the compounds are very readily soluble in organic solvents, it is possible to prepare high-strength solutions thereof, such as, for example, 50% strength by weight solutions, in dimethylformamide or dimethylacetamide. These solutions can be added directly to the polymer solutions, whereupon protonation to give the color salt and fixing by the acid groups of the polymer take place. Moreover, solutions of color salts with those acids which, because they are readily soluble or crystallize with difficulty, cannot be separated out from the aqueous solutions, or can be separated out only incompletely and only with a relatively high salt content, can also particularly advantageously be prepared. This applies, in particular, to the salts of organic acids, such as, for example, the acetates, formates and propionates, which can be prepared in a simple manner by adding the equivalent amount of acetic acid, formic acid or propionic acid to the solutions of the compounds of the formulae (1A) or (12) in the polymer solution.

The new quaternary azamethine compounds of the general formula (1) are furthermore suitable, according to the invention, for spin-dyeing acid-modified fibers, and are particularly outstandingly suitable for spin-dyeing acid-modified polyacrylonitrile fibers and copolymers thereof by the customary wet-spinning and dry-spinning procedures. The dyeings are distinguished by a good depth of color, clear color shades and outstanding fastness to light and wet processing. Although they can be water-soluble, depending on the anion, and, in particular, are very readily soluble in the solvents used for the preparation of the spinning solutions, such as, for example, dimethylformamide, dimethylacetamide, dimethylsulfoxide and ethylene carbonate, they do not bleed in the coagulation baths, drawing baths and washing baths.

The examples below serve to illustrate the invention. Unless otherwise indicated, the parts are parts by weight and the percentage data relate to percentages by weight. The parts by weight to parts by volume are as kilogram to liter.

EXAMPLE 1

18 parts of 2-(2'-aminophenoxy)-1-(N,N-dimethylamino)-ethane are diazotized in the customary manner in 200 parts of water and 42 parts by volume of 30% strength aqueous hydrochloric acid with 21 parts by volume of an aqueous 5 N sodium nitrite solution at 0° to 10° C. The resulting diazonium salt solution is allowed to run into a suspension of 17.5 parts of 1,3,3- trimethyl-2-methyleneindoline in 100 parts of water. The coupling is brought to completion at a pH value of 1.8 to 2.2 by dropwise addition of 10.5 parts by volume of an aqueous 5 N sodium hydroxide solution. The dye-stuff base of the formula

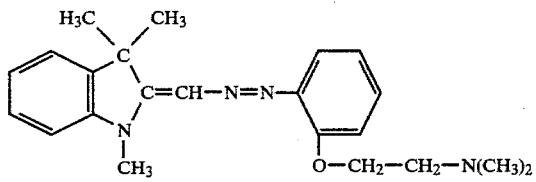

is precipitated with ammonia, filtered off and dried. It is obtained as a yellow crystalline powder in a yield of about 37 parts.

It is converted into the corresponding ammonium salt in aqueous solution with acids, for example with hydrochloric acid or with acetic acid, and can be isolated therefrom by spray-drying. In an acid bath, with the addition of the customary dyeing auxiliaries and using the customary temperatures, this dyestuff dyes polyacrylonitrile fibers in fast yellow shades.

EXAMPLE 2

18.2 parts of the azamethine compound described in Example 1, in the form of the base, are stirred into 100 parts of water, together with 4 parts of magnesium oxide; 20 parts by volume of dimethyl sulfate are added dropwise at about 40° to 50° C., whereupon the pH value drops from 9 to 8.4. The mixture is subsequently stirred at 40° to 50° C. for 4 hours and is diluted with 20 parts of water and the resulting solution is clarified, and acidified down to a pH value of 3.5 with 10 parts by volume of aqueous 30% strength hydrochloric acid. A solution of 12 parts of sodium tetrafluoborate in 100 parts of water is allowed to run into this solution, whilst stirring. The dyestuff salt, which has precipitated as crystals, is filtered off after one hour and is washed free from salts with 100 parts of water and dried.

About 25 parts of a yellow-brown compound of the formula

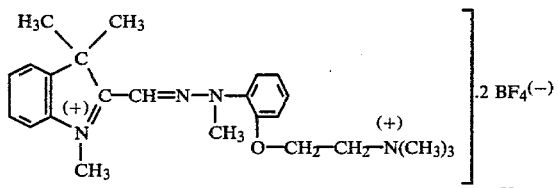

which dissolves to the extent of over 20% in dimethylformamide and dimethylacetamide, are obtained. As a dyestuff, this compound is particularly suitable for spin-dyeing polyacrylonitrile by a customary wet-spinning or dry-spinning process. A reddish-tinged yellow dyeing which is outstandingly fast to light and has a very good fastness to rubbing, fastness to thermofixing, fastness to washing, fastness to acid and alkaline perspiration, fastness to dry-cleaning and fastness to bleaching with sodium chlorite is obtained on the polyacrylonitrile fibers. The exceptionally slight bleeding of the dyestuff from the spun fibers into the coagulating baths, drawing baths and washing baths is to be particularly emphasized.

EXAMPLE 3

The procedure followed for the preparation of a basic azamethine compound is the same as described in Example 1, but 18 parts of 2-(4'-aminophenoxy)-1-(N,N-dimethylamino)-ethane are employed as the diazo component. About 36 parts of the compound of the formula

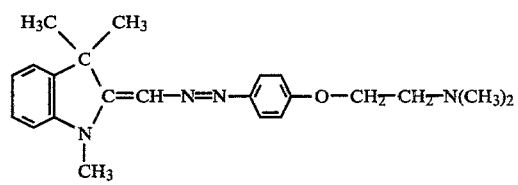

are obtained. This compound can be converted into the corresponding ammonium salt by dissolving in an equivalent amount of an acid, for example hydrochloric acid, sulfuric acid or acetic acid, and the ammonium salt can be isolated, for example, by spray-drying or by salting out. This compound dyes polyacrylonitrile fiber materials in golden yellow, fast shades from an acid bath by a dyeing procedure analogous to the customary procedures for dyeing polyacrylonitrile fibers with basic or cationic dyestuffs.

EXAMPLE 4

18.2 parts of the azamethine compound of Example 3, in the form of the base, are quaternized with 20 parts by volume of dimethyl sulfate by a procedure analogous to that described in Example 2; the reaction solution subsequently clarified when the reaction has ended is adjusted to the pH value of 3 with about 10 parts by volume of 30% strength aqueous hydrochloric acid. 15 parts by volume of an aqueous 64% strength zinc chloride solution are then added and the resulting zinc chloride double salt is precipitated with sodium chloride. The precipitate is filtered off and dried and a brown-yellow, crystalline powder which contains about 30.5 parts of the compound of the formula

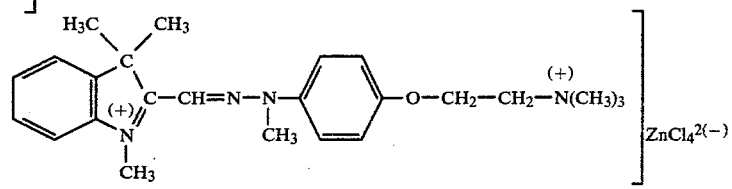

is obtained. This compound is outstandingly suitable as a dyestuff for dyeing polyacrylonitrile fibers and acid-modified polyester fibers by customary dyeing procedures, for example by an exhaustion process; dyeings which have golden yellow color shades and are very fast to light are obtained.

EXAMPLE 5 a 18 parts of 2-(2'-aminophenoxy)-1-(N,N-dimethylamino)-ethane are dissolved in 100 parts of water and 26 parts by volume of 30% strength aqueous hydrochloric acid. 23 parts of sodium tetrafluoroborate are added, and a solution of 20.5 parts of 1,3,3-trimethylindoline-2-methylene-aldehyde in 25 parts by volume of glacial acetic acid is then added dropwise at 20° C., whilst stirring. The salt which is formed from the azamethine compound thus prepared soon starts to crystallize out; stirring is continued at room temperature for a further 12 hours. Thereafter, the thin layer chromatogram shows that no further starting material is present and the azamethine compound formed has largely precipitated. It is filtered off, washed free from salts with 100 parts of water and dried. About 52 parts of a yellow crystalline powder of the compound of the formula

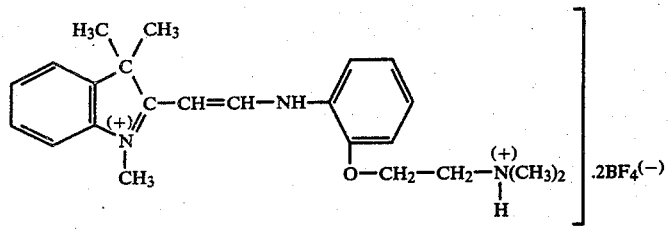

are obtained. The compound has very good dyestuff properties and, for example, dyes polyacrylonitrile fiber materials, from a weakly acid bath by a customary exhaustion dyeing method, in greenish-tinged yellow shades with very good fastness to light.

However, the above compound is particularly suitable for spin-dyeing polyacrylonitrile by customary wet-spinning and dry-spinning processes. Greenish-tinged yellow dyeings which are outstandingly fast to light and have a very good fastness to rubbing, fastness to thermofixing, fastness to washing, fastness to dry-cleaning, fastness to perspiration and fastness to bleaching with sodium chlorite are thereby obtained.

The very good solubility of this salt according to the invention, which is more than 20%, in dimethylformamide and dimethylacetamide and the extremely slight bleeding in the coagulating baths, drawing baths and washing baths are to be particularly emphasized.

EXAMPLE 5 b 18 parts of 2-(4'-aminophenoxy)-1-(N,N-dimethylamino)-ethane are dissolved in 50 parts of water and 50 parts by volume of 5 N aqueous hydrochloric acid, and a solution of 20.5 parts of 1,3,3-trimethyl-indoline-2-methylene-aldehyde in 50 parts by volume of glacial acetic acid is added. The mixture is then stirred at room temperature for about a further 12 hours, the yellow-brown solution is filtered and a solution of 15 parts of zinc chloride in 100 parts of water is slowly added dropwise to the filtrate. The zinc chloride double salt of the azamethine compound prepared separates out in brownish-yellow crystals. It is filtered off, rinsed with a little water and dried at about 60° C. 54.5 parts of a yellow crystalline powder of the compound of the formula

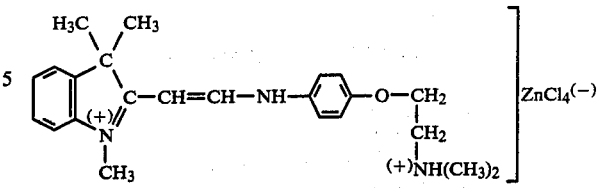

are obtained. The compound is particularly suitable for spin-dyeing polyacrylonitrile by customary wet-spinning and dry-spinning processes. Greenish-tinged yellow dyeings which are outstandingly fast to light and have a very good fastness to rubbing, fastness to thermofixing, fastness to washing, fastness to dry-cleaning, fastness to perspiration and fastness to bleaching with sodium chlorite are obtained. The very good solubility of this salt according to the invention of about 30% in dimethylformamide and the extremely slight bleeding in the coagulating baths, drawing baths and washing baths are to be particularly emphasized.

EXAMPLE 5 c 36 parts of 2-(4'-aminophenoxy)-1-N,N-(dimethylamino)-ethane are dissolved in 210 parts of water and 60 parts by volume of aqueous 30% strength hydrochloric acid. 41 parts of 1,3,3-trimethy-indoline-2-methylene-aldehyde are then introduced at room temperature in the course of 30 minutes and the mixture is subsequently stirred for about 3 to 4 hours. A small amount of an insoluble residue is filtered off and the clear solution is then added dropwise to 200 parts by volume of an aqueous 5 N sodium hydroxide solution in the course of about 30 minutes. A yellowish oil initially separates out, and solidifies in the form of crystals on further stirring at room temperature. The crystals are then filtered off and washed with water until neutral and free from salts and the product is dried at 40° C. 71 parts of yellowish crystals which, after recrystallization from benzine with a boiling point of 80°–100° C., have a melting point of 97° C. are obtained. This compound is the anhydro base of the compound of Example 5b and has the following structure:

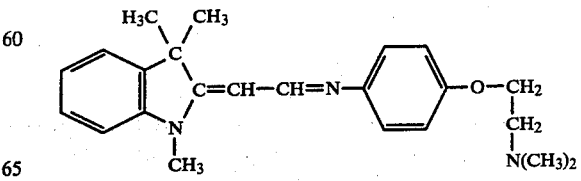

which, with respect to the chemical compositions, was confirmed by C, H, N, O analysis.

18 parts of this anhydro compound, which had been washed free from salts and dried, are dissolved in 100 parts of dimethylformamide; 6 parts of acetic acid are added and the resulting yellow solution of the dye-stuff diacetate of the formula

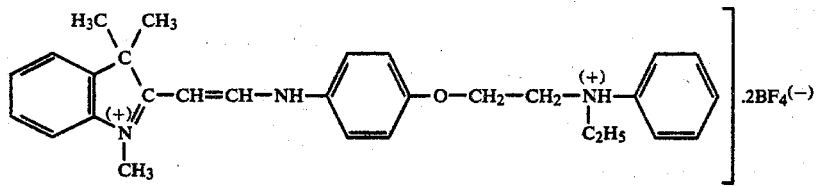

salts with about 200 parts of water and dried. About 58 parts of the compound of the formula

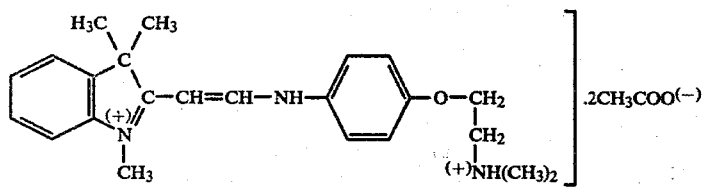

are obtained. In the spin-dyeing of polyacrylonitrile by a customary wet-spinning or dry-spinning process, this dyestuff salts gives intensely greenish-tinged yellow dyeings; the dyed filaments obtained have the same fastness properties as those mentioned for the dye-stuff of Example 5.

is used for spin-dyeing, for example analogously to the dyeing example D given below. Intensively yellow-colored fibers, the fastness properties of which correspond to those of the dyeings obtained with the dyestuff from Example 5b are thereby obtained. Staining of the coagulating baths, drawing baths and washing baths is only extremely slight.

Similar good results are obtained when dimethylacetamide is used as the solvent and the procedure followed is, for example, as according to Dyeing Example G.

EXAMPLE 6

25.6 parts of 2-(4′-aminophenoxy)-1-(N-ethyl-N-phenyl)-aminoethane are dissolved in 100 parts of water and 26 parts by volume of aqueous 30% strength hydrochloric acid. 23 parts of sodium tetrafluoroborate are added. A solution of 20.5 parts of 1,3,3-trimethylindoline-2-methylene-aldehyde in 25 parts by volume of glacial acetic acid is allowed to run slowly into this solution at 20° C. The salt of the azomethine compound which is formed slowly starts to precipitate out, sometimes first as a smeary substance which becomes crystalline during subsequent stirring in the course of 12 hours. The crystalline product is filtered off, washed free from

EXAMPLES 7 TO 20

In the following examples, further compounds according to the invention are described in tabular form. They can likewise be prepared in the manner according to the invention by one of the procedures disclosed in the description, for example by one of the reaction procedures described in the above embodiment examples. As dyestuffs, they are likewise very suitable for dyeing, by customary dyeing processes, polyacrylonitrile fiber materials, preferably acid-modified polyacrylonitrile fiber materials, and other acid-modified materials, such as, for example, acid-modified polyester fibers and acid-modified polyamide fibers, with good fastness properties in the color shades given as belonging thereto. Because of their good fastness properties and the slight amount of bleeding in the coagulating baths, drawing baths and washing baths, they are particularly suitable for spin-dyeing polyacrylonitrile by a customary wet-spinning or dry-spinning process.

| Example | Compound corresponding to the general formula (1) | Shade of the dyeing |
|---|---|---|
| 7 | 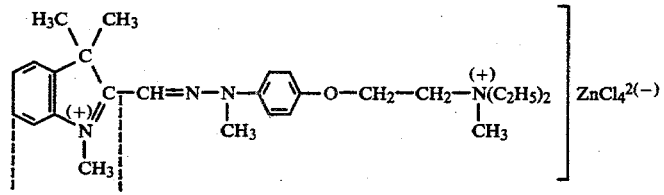 given as D- in the following examples | golden yellow |
| 8 | 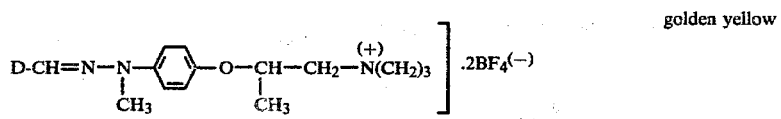 | golden yellow |

-continued
| Example | Compound corresponding to the general formula (1) | Shade of the dyeing |
|---|---|---|
| 9 | 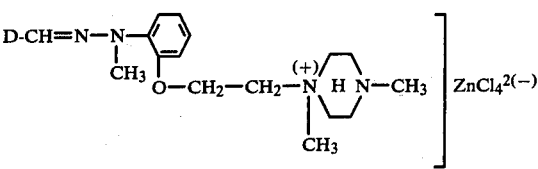 | golden yellow |
| 10 | 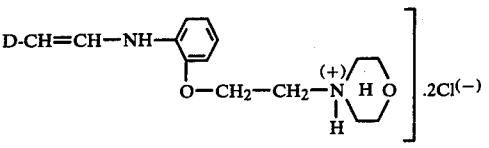 | yellow |
| 11 | 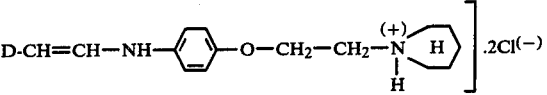 | yellow |
| 12 | 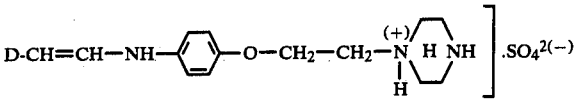 | yellow |
| 13 | 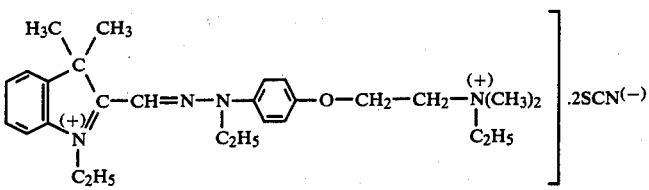 | golden yellow |
| 14 | 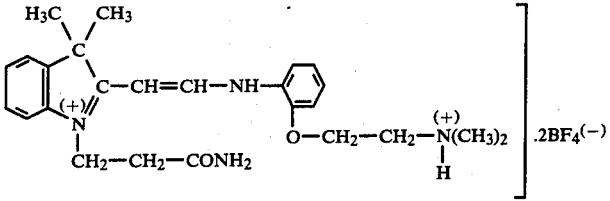 | yellow |
| 15 | 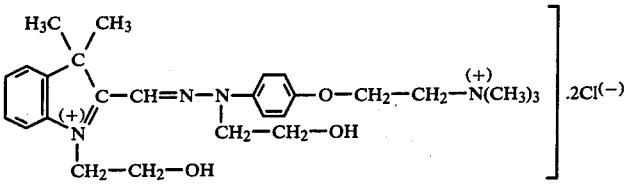 | golden yellow |
| 16 | 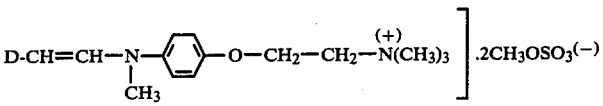 | yellow |
| 17 | 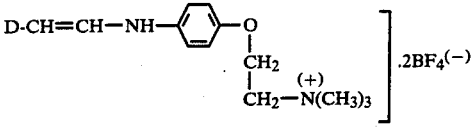 | yellow |

-continued

| Example | Compound corresponding to the general formula (1) | Shade of the dyeing |
|---|---|---|
| 18 | D-CH=CH-NH-⟨Cl⟩-O-CH$_2$-CH$_2$-$\overset{(+)}{\text{N}}$(CH$_3$)$_2$ ·2BF$_4^{(-)}$ (H) | yellow |
| 19 | D-CH=N-N(CH$_3$)-⟨CH$_3$⟩-O-CH$_2$-CH$_2$-$\overset{(+)}{\text{N}}$(CH$_3$)$_2$ ·2BF$_4^{(-)}$ (H) | golden yellow |
| 20 | (indoline with R′, H$_3$C, CH$_3$, N-CH$_3$)-C=CH-CH=CH-NH-⟨⟩-O-CH$_2$-CH$_2$-$\overset{(+)}{\text{N}}$(CH$_3$)$_2$ ·2BF$_4^{(-)}$ (H) | |
| 20a | R′ = CH$_3$—O | yellow |
| 20b | R′ = CH$_3$— | yellow |
| 20c | R′ = Cl— | yellow |
| 20d | R′ = NO$_2$— | yellow |
| 20e | R′ = CH$_3$O—OC— | yellow |
| 21 | D-CH=N-N(CH$_3$)-⟨⟩-O-CH$_2$-CH$_2$-$\overset{(+)}{\text{N}}$(CH$_3$)(C$_2$H$_5$) ·2BF$_4^{(-)}$ | yellow |
| 22 | D-CH=CH-NH-⟨⟩-O-CH$_2$-CH$_2$-$\overset{(+)}{\text{N}}$(CH$_3$)(C$_2$H$_5$) ·2BF$_4^{(-)}$ | yellow |
| 23 | (Cl-indoline, H$_3$C, CH$_3$, N-CH$_3$)-C=CH-CH=CH-NH-⟨⟩-O-CH$_2$-CH$_2$-$\overset{(+)}{\text{N}}$(CH$_3$)$_3$ ·2Cl$^{(-)}$ | yellow |
| 24 | (NO$_2$-indoline, H$_3$C, CH$_3$, N-CH$_3$)-C=CH-CH=CH-NH-⟨⟩-O-CH$_2$-CH$_2$-$\overset{(+)}{\text{N}}$(CH$_3$)$_3$ ·2Cl$^{(-)}$ | yellow |

DYEING EXAMPLE A 20 parts of the dyestuff salt from Example 4 and 80 parts of dextrin are ground in a powder mill for 4 hours. (The same dyestuff mixture can likewise be obtained by forming a paste in 100 parts of water and then spray-drying the paste). To produce an aqueous dyebath, one part of the preparation thus obtained is made into a paste with one part of aqueous 40% strength acetic acid, 200 parts of water are poured over the paste, the mixture is boiled up for a short time and then diluted with 7,000 parts of water, and 2 parts of glacial acetic acid are added. 100 parts of a polyacrylonitrile fabric, which, if appropriate, has first been pre-treated in a bath of 8,000 parts of water and 2,000 parts of glacial acetic acid at 60° C. for 10 to 15 minutes, are introduced into this dyebath at 60° C. The dyebath is then warmed from 60° C. to 98° to 100° C. in the course of 30 minutes; dyeing is then continued at the boil for 90 minutes and the dyed material is subsequently taken out of the bath and rinsed thoroughly with water. A reddish-tinged yellow dyeing with good fastness to light and good fastness to wet processing is obtained.

Using the dyestuff salt of Example 4, it is possible to prepare a concentrated dyestuff solution which consists of 10 parts of this salt in 60 parts of glacial acetic acid and 30 parts of water and which, as a stable solution with a dyestuff content of about 10%, can be used for the preparation of dyebaths and for dyeing polyacrylonitrile, for example according to the above dyeing instructions.

DYEING EXAMPLE B 20 parts of the dyestuff described in Example 4 are mixed with 80 parts of dextrin in a ball mill for 48 hours. One part of the preparation thus obtained is made into a paste with one part of aqueous 40% strength acetic acid, 200 parts of water are poured over the paste and the mixture is boiled up for a short time. This stock solution can be used for dyeing as follows:

1. It is diluted with 7,000 parts of water, and 21 parts of anhydrous sodium sulfate, 14 parts of ammonium sulfate, 14 parts of formic acid and 15 parts of a carrier based on reaction products of ethylene oxide and dichlorophenols are added; 100 parts of a polyester fabric modified by acid groups are added, at 60° C., to the dyebath thus prepared; if appropriate, this material has first been pre-treated in a bath of 8,000 parts of water and 2 parts of glacial acetic acid at 60° C. for 10 to 15 minutes. The dyebath is now warmed to a temperature of 98° to 100° C. in the course of 30 minutes, dyeing is continued at the boil for one hour and the dyed material is taken out of the bath and rinsed thoroughly. A level reddish-tinged yellow dyeing with good fastness to wet processing and good fastness to light is obtained.

2. The above stock solution is diluted with 3,000 parts of water, 18 parts of anhydrous sodium sulfate and 6 parts each of ammonium sulfate and formic acid are added, the mixture is warmed to 60° C. and 100 parts of an acid-modified polyester fabric are then introduced. This bath is then warmed to 110° C. in a closed vessel in the course of 45 minutes, dyeing is continued at this temperature for one hour, the dyebath and the fabric to be dyed being agitated, and the bath is then cooled to 60° C. in the course of 25 minutes and the dyed material is taken out and rinsed thoroughly. A level reddish-tinged yellow dyeing with good fastness to wet processing and good fastness to light is obtained.

DYEING EXAMPLE C 20 parts of the dyestuff from Example 5a are mixed with 80 parts of dextrin in a ball mill for 48 hours. One part of the preparation thus obtained is made into a paste with one part of aqueous 40% strength acetic acid, 200 parts of water are poured over the paste and the mixture is boiled up for a short time. To prepare a dyebath, this dyestuff solution is diluted with 7,000 parts of water, and 21 parts of anhydrous sodium sulfate, 14 parts of ammonium sulfate, 14 parts of formic acid and 15 parts of a carrier based on reaction products of ethylene oxide and dichlorophenols are added, the liquor is buffered to a pH value of 6 with an acid aqueous buffer solution (for example acetic acid/sodium acetate), this dyebath is warmed to 50° C. and 100 parts of a fabric of polyamide modified by anionic groups are added (the liquor ratio is now about 1:75 to 1:80). The bath is warmed to 98° C. in the course of 45 minutes, dyeing is continued at the boiling point for one hour and the dyed material is taken out of the bath and rinsed thoroughly under running water at 70° to 80° C. and then under cold water. For drying, the fabric can be centrifuged and then ironed. A greenish-tinged yellow dyeing with good fastness properties is obtained.

DYEING EXAMPLE D 2.8 parts of a 5% strength solution of the dye-stuff of Example 5b in dimethylformamide are added to 100 parts of a 28% strength solution of a polymer comprising 94% of acrylonitrile, 5% of methyl acrylate and 1% of sodium methallyl-sulfonate in dimethylformamide. The resulting yellow-colored spinning solution is homogenized by stirring for a short time and is warmed to 80° C. The solution is now spun into a coagulating bath at 50° C., which consists of 50% by volume of dimethylformamide and 50% by volume of water, using a 100-orifice spinneret with a hole diameter of 80 μm. The resulting filaments are drawn in the following passage through a drawing bath at 80° C., consisting of 30% by volume of dimethylformamide and 70% by volume of water, and are then passed through a washing bath of hot water at 90° to 95° C. and washed therein. Very deep, yellow-colored filaments with a high luster and exceptionally good fastness to water, washing, perspiration, rubbing when dry and rubbing when wet and very good fastness to light are obtained.

The coagulating, drawing and washing baths are only very slightly stained.

DYEING EXAMPLE E 0.3 parts of a 5% strength solution of the dye-stuff from Example 22 in dimethylformamide is stirred into 107 parts of a 28% strength solution of a polymer comprising 95% of acrylonitrile, 4.5% of methyl acrylate and 0.5% of sodium methallylsulfonate in dimethylformamide. After stirring the mixture for a short time, a completely homogeneous spinning solution is obtained; this is spun, and the filaments are drawn and washed, according to the statements of Dyeing Example D. A yellow dyeing with very good fastness properties is obtained. The coagulating, drawing and washing baths are hardly noticeably stained.

DYEING EXAMPLE F 5 parts of a 10% strength solution of the dye-stuff from Example 6 in dimethylformamide are added to 100 parts of a 28% strength solution of a polymer comprising 85% of acrylonitrile, 13% of vinyl chloride and 2% of sodium methallylsulfonate in dimethylformamide. The resulting yellow-colored spinning solution is homogenized and warmed to 40° C. It is spun into a coagulating bath of 60% by volume of dimethylformamide and 40% by volume of water, and the filaments are drawn in a drawing bath of 50% by volume of dimethylformamide and 50% by volume of water and then washed in hot water at 80° to 85° C. Lustrous, golden yellow-colored filaments with outstanding fastness properties are obtained; the dyestuff bleeds only very slightly in the baths.

DYEING EXAMPLE G 1.3 parts of a 10% strength solution of the dye-stuff from Example 5b in dimethylacetamide are stirred into 100 parts of a 26% strength solution of a polymer comprising 85% of acrylonitrile, 14.5% of vinyl acetate and 0.5% of sodium methallylsulfonate in dimethylacetamide at 70° to 80° C., a completely homogeneous spinning solution being formed after stirring the mixture for a short time. The spinning solution is spun into a coagulating bath at 80° C., consisting of 70% by volume of dimethylacetamide and 30% by volume of water, using a 100-orifice spinneret with an orifice diameter of 100 μm, and the filaments are then drawn in a drawing bath at 80° C., consisting of 70% by volume of dimethylacetamide and 30% by volume of water, and washed in a hot washing bath at 85° to 90° C., consisting of 5% by volume of dimethylacetamide and 95% by volume of water. Lustrous, yellow-colored filaments which have very good fastness properties are obtained. The dyestuff bleeds only very slightly in the baths.

DYEING EXAMPLE H 5 parts of a 5% strength solution of the dyestuff from Example 5b in dimethylformamide are homogeneously mixed, by stirring for a short time, with a 25% strength solution of a polymer comprising 59% of acrylonitrile, 40% of vinylidene chloride and 1% of sodium methallylsulfonate. The resulting spinning composition is warmed to 50° C. and spun into a coagulating bath at 50° C., consisting of 65% by volume of dimethylformamide and 35% by volume of water, and the filaments are then drawn in a bath consisting of 35% by volume of dimethylformamide and 65% by volume of water having a temperature of 80° to 85° C. and washed in water at 90° to 95° C. Yellow-colored filaments which have a high gloss and which hardly bleed in the baths are obtained.

DYEING EXAMPLE J 0.36 part of the dyestuff from Example 4 are added to 100 parts of an 18% strength solution of the polymer described in Example D in ethylene carbonate at 80° to 90° C. After thoroughly stirring the mixture, the homogeneous spinning composition is spun by the wet-spinning process, a hot coagulating bath at 80° C., consisting of 50% by volume of ethylene carbonate and 50% by volume of water, being used; drawing is then carried out in a bath at 80° C., consisting of 30% by volume of ethylene carbonate and 70% by volume of water, and the filaments are washed in a bath consisting of 5% by volume of ethylene carbonate and 95% by volume of water, at a temperature of 70° to 80° C. Very intensely yellow-colored filaments with an excellent luster and very good fastness to wet processing and rubbing are obtained. The bleeding in the baths is only very slight.

DYEING EXAMPLE K 0.1 part of the dyestuff from Example 23 are added to 100 parts of a 23% strength solution of the polymer described in Example D in dimethylsulfoxide and dissolved, with stirring, to give a homogeneous yellow spinning solution. This solution is spun by the wet-spinning process, a bath at 30° C., consisting of 55% by volume of dimethylsulfoxide and 45% by volume of water, being used for the coagulation; the filaments are then drawn in a bath at 30° C., consisting of 40% by volume of dimethylsulfoxide and 60% by volume of water, and washed in hot water at 80° C. Yellow-colored filaments with a very high luster and very good fastness properties are obtained; the coagulating, drawing and washing baths are stained only very slightly.

DYEING EXAMPLE L 0.5 part of the dyestuff from Example 13 is added to a solution of 54 parts of the polymer described in Example D and 156 parts of a 48% strength aqueous sodium thiocyanate solution at 20° C. The entire mixture is homogenized by stirring, and a completely clear spinning solution is obtained, which is spun into a 10% strength aqueous sodium thiocyanate solution, as the coagulating bath, with a temperature of 20° C.; the filament is then drawn in an 8% strength aqueous sodium thiocyanate solution at 40° to 45° C. and washed in water at 70° to 80° C. Lustrous, yellow-colored filaments with very good fastness to rubbing and wet processing are obtained. The coagulating, drawing and washing baths are stained only to an insignificant extent.

DYEING EXAMPLE M

The other compounds (dyestuffs) according to the invention can also be employed with equally good success for dyeing materials in a manner similar to or the same as that described in the above dyeing examples.

We claim:

1. An azamethine compound of the formula (1)

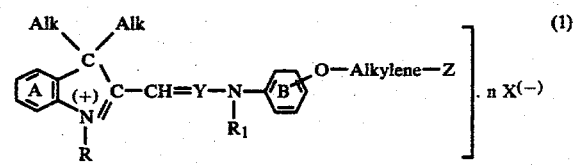

in which
R is alkyl of from 1 to 4 C atoms, unsubstituted or substituted by carbamoyl, alkanoyloxy of from 1 to 4 C atoms, carbalkoxy of from 1 to 4 C atoms in the alkyl moiety, hydroxy, cyano or phenyl,
Alk is alkyl of from 1 to 4 C atoms, the two radicals Alk are identical to each other or different from one another,
Y is methine or nitrogen,
$R_1$ is hydrogen or alkyl of from 1 to 4 C atoms, unsubstituted or substituted by carbamoyl, alkanoyloxy of from 1 to 4 C atoms, carbalkoxy of from 1 to 4 C atoms in the alkyl moiety, hydroxy, cyano or phenyl,
Alkylene is a straight-chain or branched alkylene of from 2 to 6 C atoms,
Z is a group of the formula (2a) or (2b)

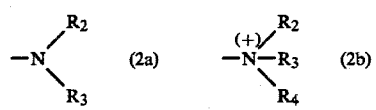

in which $R_2$ is alkyl of from 1 to 4 C atoms, unsubstituted or substituted by carbamoyl, alkanoyloxy of from 1 to 4 C atoms, carbalkoxy of from 1 to 4 C atoms in the alkyl moiety, hydroxy, cyano or phenyl,
$R_3$ is alkyl of from 1 to 4 C atoms, unsubstituted or substituted by carbamoyl, alkanoyloxy of from 1 to 4 C atoms, carbalkoxy of from 1 to 4 C atoms in the alkyl moiety, hydroxy, cyano or phenyl, or R₃ is phenyl unsubstituted or substituted by 1 or 2 substituents selected from the group consisting of chlorine, alkyl with 1 to 4 C atoms, alkoxy with 1 to 4 C atoms, nitro, carbalkoxy with 1 to 4 C atoms in the alkyl moiety and carbamoyl, and R₄ is hydrogen, or alkyl of from 1 to 4 C atoms, unsubstituted or substituted by carbamoyl, alkanoyloxy of from 1 to 4 C atoms, carbalkoxy with 1 to 4 C atoms in the alkyl, hydroxy, cyano or phenyl, or R₂ and R₃, together with the nitrogen atom, form the piperidino, piperazino or morpholino radical, or R₂ and R₃ or R, R and R, together with the positively charged nitrogen atom, form the piperidinium, morpholinium, piperazinium, 4-N-methylpiperazinium or pyridinium radical, the benzene nucleus A is unsubstituted or substituted by 1 or 2 substituents selected from the group consisting of halogen, nitro, cyano, sulfamoyl, alkyl with 1 to 4 C atoms, alkoxy with 1 to 4 C atoms and carbalkoxy with 1 to 4 C atoms in the alkyl, the benzene nucleus B is unsubstituted or substituted by 1 or 2 substituents selected from the group consisting of halogen, nitro, alkyl with 1 to 4 C atoms, alkoxy with 1 to 4 C atoms and carbalkoxy with 1 to 4 C atoms in the alkyl, n is the number 1 or 2, and $X^{(-)}$ is the equivalent of a colorless anion.

2. A compound of the formula (1A)

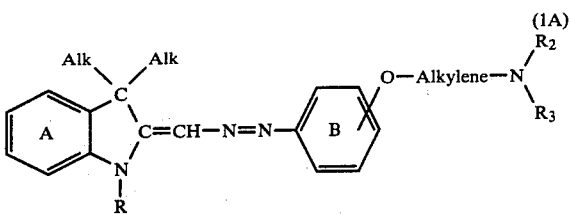

in which R, Alk, Alkylene, R₂ and R₃ and the benzene nuclei A and B are defined as in claim 1, or a salt thereof with an organic or inorganic acid.

3. A quaternary azamethine compound according to claim 1 of one of the formulae

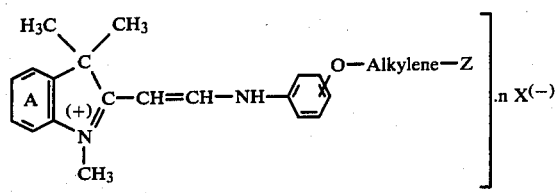 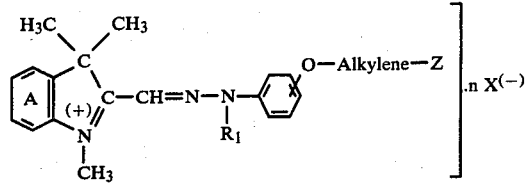

in which the benzene nucleus A is unsubstituted or substituted by substituents selected from the group consisting of halogen, methyl, methoxy and carbalkoxy with 1 to 4 C atoms in the alkyl, Z is dialkylamino, dialkylammonium or trialkylammonium with 1 to 4 C atoms in each alkyl, R₁ is methyl or ethyl, n is 1 or 2, and $X^{(-)}$ and Alkylene are defined as in claim 1.

4. A compound of one of the formulae

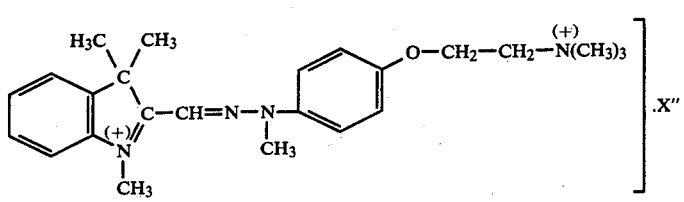

(a)

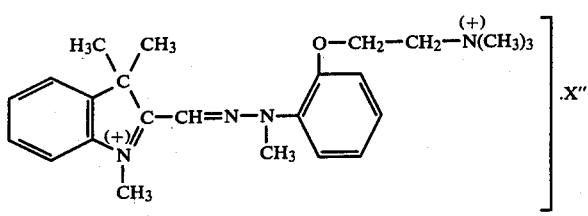

(b)

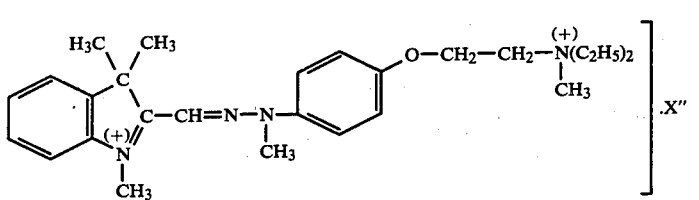

(c)

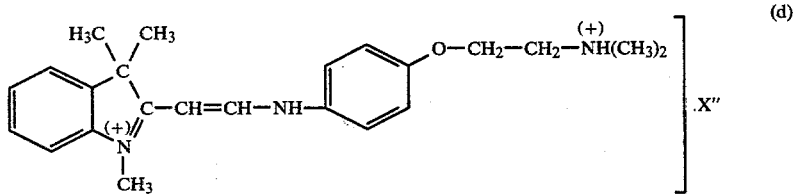
(d)
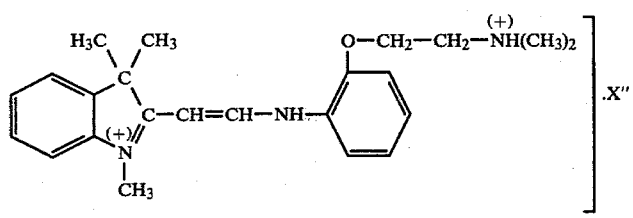
(e)
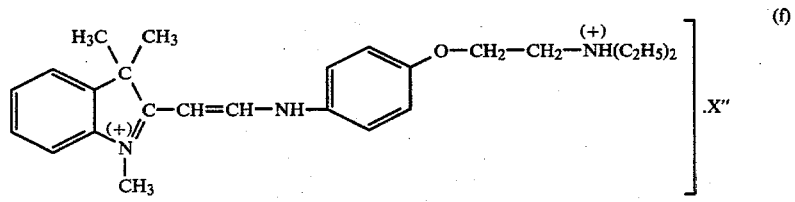
(f)
according to claim 1 in which X" is an equivalent of a colorless anion.
5. A compound according to claim 2 selected from:
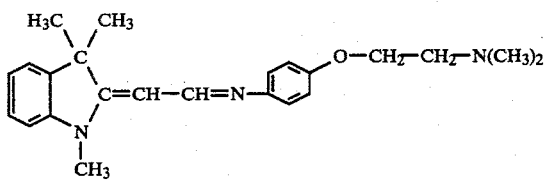
and
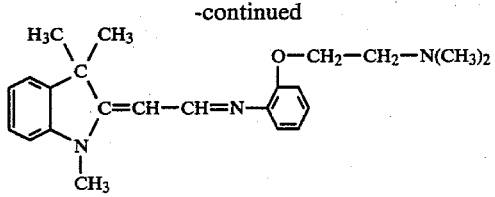
6. A compound consisting of an azamethine compound of claim 1, 2, 3 or 4 and an anionic precipitating agent selected from the group consisting of alumina, tannin, the phosphotungstic acids and the phosphomolybdic acids.
* * * * *